Patented May 28, 1935

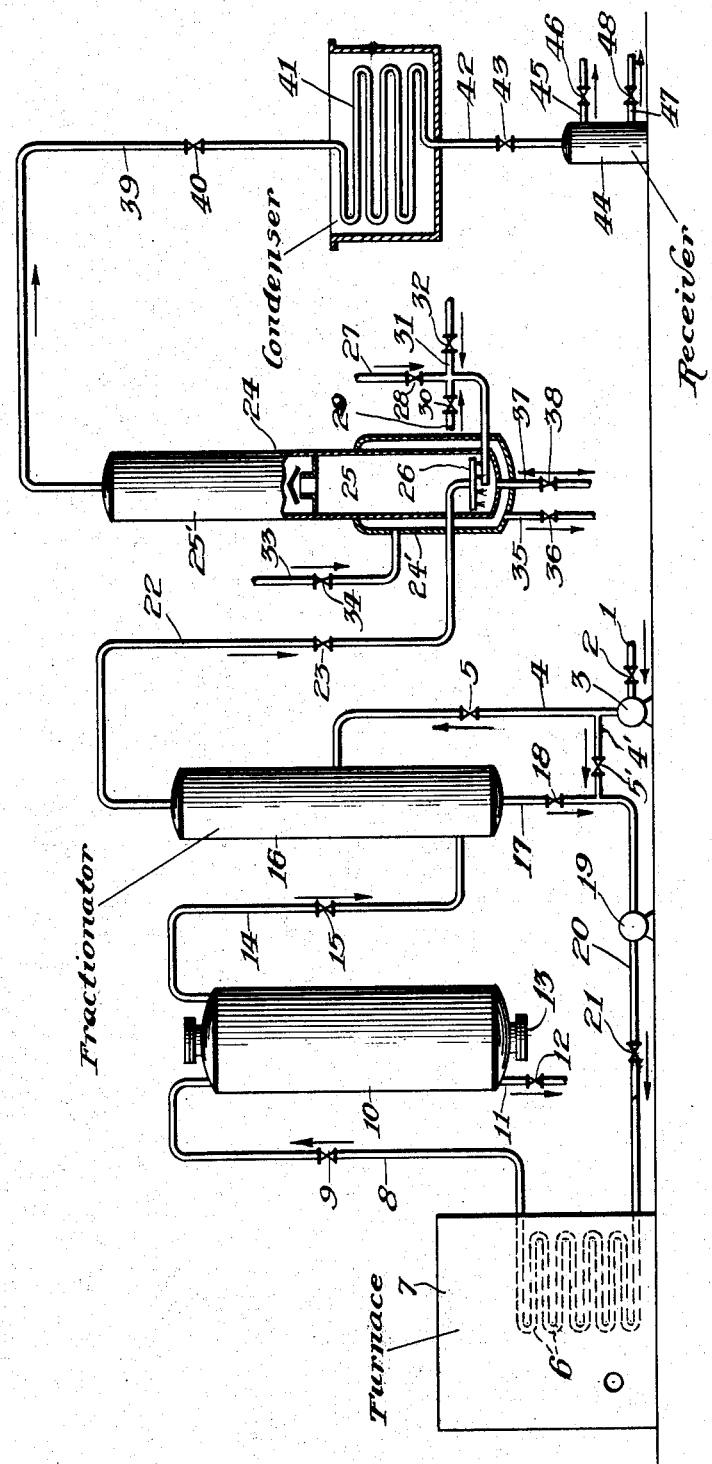

2,002,747

UNITED STATES PATENT OFFICE 2,002,747

TREATMENT OF HYDROCARBON OILS

Jacque C. Morrell, Chicago, Ill., assignor to Universal Oil Products Company, Chicago, Ill., a corporation of South Dakota Application January 30, 1931, Serial No. 512,475
Renewed August 23, 1933

11 Claims. (Cl. 196—36)

This invention relates to the treatment of hydrocarbon oils and refers more particularly to the treatment of hydrocarbon fractions produced in cracking reactions.

More specifically the invention contemplates the treatment of the relatively lighter portions of cracked oils with reagents capable of effecting substantial desulfurization and hydrogenation with resultant improvement in the quality of the oils.

In the specific embodiment of the invention cracked hydrocarbon vapors are passed thru metals of the alkaline or alkaline earth groups preferably in a molten state altho the metals may be solid under some conditions of treatment along with such gases as ammonia, steam and air, preferably the former, the resultant reactions forming in part sulfides of the metals involved, hydrogen sulfide and hydrogen in a state sufficiently reactive to substantially saturate the olefinic constituents of the vapors. The vapors to be treated may arise from an ordinary distillation system or from a cracking system, e. g. the cracked vapors for treatment may be produced by introducing high boiling hydrocarbon oil charging stocks into direct contact with cracked vapors in a preliminary fractionator constituting part of a cracking lay-out wherein heat exchange is effected and reflux condensates mixed with raw oil are taken by a combined feed pump and pumped to suitable heating element. During passage thru the heating element heat is added to initiate desired conversion reactions, the vapors are passed to an enlarged zone to permit continuance of the reactions with the separation of heavy carbonaceous residues from vapors, the latter being passed under reduced or differential pressures to preliminary fractionating equipment wherein light vapors and reflux condensates amenable to retreatment are produced. These light vapors pass to containers holding the metals which are heated when it is desired to treat with the molten metal thru which the vapors rise along with proportioned mixtures of ammonia, steam and air and are thereby treated to produce refined vapors which are cooled, condensed and collected.

In carrying out the process of the invention various types of equipment may be employed, generally of a kind suitable for permitting contact of the hydrocarbon vapors to be treated with the molten metals and other reagents. One kind of equipment suitable for illustrating the process is represented in the attached diagrammatic drawing to which reference is made to enable a clear description. Raw oil charging stocks typified by the heavier portions of naturally occurring petroleums or fractions heavier than gasoline may be taken from line 1 containing valve 2 by pump 3 and discharged either to line 4 containing valve 5 or line 4' containing valve 5'. Line 4 leads to preliminary fractionator 16 in which the incoming raw oil exchanges heat with the cracked vapors and assists in their fractionation. Reflux condensates from the fractionator leave thru line 17 equipped with valve 18 and leading to combined feed pump 19. Line 4' containing valve 5' leads also to pump 19 and enables direct feed of raw oil when desirable. Pump 19 discharges to line 20 containing valve 21, this line leading to heating element 6 which may be a combination of tubular elements constituting a continuous pipe coil disposed to receive heat from furnace 7. During passage thru the heating element heat may be added to a degree sufficient to initiate desired conversion reactions, the heated products passing thru line 8 containing valve 9 into enlarged zone 10 in which the reactions are allowed to progress to a definite point. Temperatures at the exit of heating element 6 may be of the order of 750 to 1000° F. more or less, and pressures maintained on the reaction chamber of the order of 100 to 500 lbs. per sq. in. depending upon the type of oil charged and the degree of conversion desired. Line 11 containing valve 12 is provided for the removal of heavy liquid residues from the process and manhead 13 for similar removal of solid or semi-solid materials which may be produced by deeper or more intensive cracking reactions. Vapors leave chamber 10 thru line 14 equipped with valve 15 and enter preliminary fractionator 16 with or without pressure reduction over that differential necessary for proper conditions of flow, reflux condensates leaving thru line 17 as previously disclosed. The vapors from fractionator 16 pass thru line 22 containing valve 23, preferably with substantial pressure reduction to distributing means 26, which may be a perforated coil of pipe or any other suitable type of spray or nozzle adapted to produce small bubbles of vapor. Treating tower 24 may consist of lower section 25 and upper section 25'. The lower section is adapted to contain metals of the alkali or alkaline earth groups, either singly or in combination, and preferably in a molten condition. As examples of metals of the alkali group may be mentioned sodium, potassium, lithium, etc. and of the alkaline earth calcium, magnesium, barium, strontium, etc. To enable the maintenance of suitable temperature conditions a jacket 24' is shown which typifies any heating means that may be employed, line 33 containing valve 34 serving for the admission of hot heating fluid and line 35 containing valve 36 for the ejection of the same. Line 37 containing valve 38 is provided for the admission of fresh or the withdrawal of spent treating materials, line 27 containing valve 28 for the introduction of ammonia, line 29 containing valve 30 for the introduction of steam and line 31 containing valve 32 for the introduction of air. The reactions occurring in the lower section 25 of treating tower are characteristic of the invention and result in substantial desulfurization and hydrogenation of the cracked vapors. The reactions of ammonia with metals of the groups mentioned are of a nature dependent upon the reactivity of the metals in the groups and vary from those resulting in the disruption of the ammonia radical to produce free hydrogen and amides as in the case of sodium, to reactions of simple addition of the ammonia molecule to the metal as occurs in the case of calcium, which adds four molecules of ammonia to one atom of calcium. Depending upon conditions, imides may also be formed with progressive liberation of hydrogen and by the introduction of regulated quantities of steam and air still further amounts of hydrogen may be liberated, thus tending to increase the rate of hydrogenating reactions. The metals themselves may react to some extent with the sulfur compounds to produce their corresponding sulfides. By employing varying mixtures of the metals of the two groups masses of varying fluidity and reactivity may be provided suitable for the treatment of particular vapors. For example, if the reaction is violent or explosive when sodium alone is used, a certain amount of calcium or other alkaline earth metals may serve to moderate the speed of the reaction and bring it within controllable limits. Vice versa the sodium may be used to lower the melting point of the calcium. The vapors from the treating compartment 25 may pass to the upper portion 25' of tower 24 which contains fractionating devices not shown, such as bubble trays, and vapors of desired boiling point range may therein be produced, these passing thru line 39 containing valve 40 to condenser 41 wherein partial liquefaction is effected, the cooled products passing thru line 42 containing valve 43 into receiver 44 which is equipped with line 45 containing valve 46 for the removal of fixed gases and line 47 containing valve 48 to permit the withdrawal of liquids of desired boiling point range to suitable storage.

Similarly, hydrocarbon vapors from any source may be treated in a suitable contacting or treating device, such as a vessel or tower permitting contact between the vapors and the reagents.

It is evident from the foregoing description that the process of the invention comprises the treatment of a wide variety of cracked vapors under conditions of sufficient latitude to enable their effective transformation into liquids of a high degree of refinement. While one typical operation has been shown, it is only one of many that may be employed and as such is not to be construed in the limiting sense upon the wide scope of the invention.

As an example of the results obtainable by the operation of the process of the invention a 24° A. P. I. gravity topped crude typical of the Mid-Continent producing area may be cracked in apparatus similar to that described above to produce approximately 65% yield of motor fuel with an A. P. I. gravity of approximately 56°, a gum content of approximately 10 mg. by the copper dish method, a sulfur content of less than approximately 0.1% and a color of above 30 on the Saybolt chromometer scale, this dropping to about 25 after the usual 4 hour sun exposure tests. A mixture of calcium and sodium alone employing ammonia in both cases in the treating system shows these results. When the operation is conducted without the treating method characteristic of the process of the invention, the gasoline produced will be of a considerably less refined nature and may run as high as 300 mg. of gum per 100 cc. and have a sulfur content as high as 0.25%. This comparison is sufficient to indicate that results of great commercial value are obtainable by the operation of the process. Likewise a cracked distillate showing a gum content of approximately 600 mg. per 100 cc. and a sulfur content of about 0.6% may be distilled thru a column containing a mixture of sodium and calcium or calcium alone introducing ammonia during the treatment and a product containing a low gum content and a sulfur content of approximately 0.20% may be obtained.

I claim as my invention:

1. In the refining of cracked hydrocarbon vapors, the step which comprises passing the vapors with ammonia gas through molten alkalinous metal.

2. In the refining of cracked hydrocarbon vapors, the step which comprises passing the vapors with ammonia gas through molten alkali metal.

3. In the refining of cracked hydrocarbon vapors, the step which comprises passing the vapors with ammonia gas through a molten mixture of an alkali metal and an alkaline earth metal.

4. In the refining of cracked hydrocarbon vapors, the step which comprises passing the vapors with ammonia gas through a mixture of molten sodium and calcium.

5. In the refining of cracked hydrocarbon vapors, the step which comprises passing the vapors with ammonia gas and steam through molten alkalinous metal.

6. In the refining of cracked hydrocarbon vapors, the step which comprises passing the vapors with ammonia gas, steam and air through molten alkalinous metal.

7. A process for refining cracked distillates containing olefins and sulphur which comprises treating the distillate in vapor phase simultaneously with ammonia gas and an alkalinous metal at a temperature adequate to react the ammonia with the metal.

8. A process for refining cracked distillates containing olefins and sulphur which comprises treating the distillate in vapor phase and in the presence of steam simultaneously with ammonia gas and an alkalinous metal at a temperature adequate to react the ammonia with the metal.

9. A process for refining cracked distillates containing olefins and sulphur which comprises treating the distillate in vapor phase simultaneously with ammonia gas and an alkali metal at a temperature adequate to react the ammonia with the metal.

10. A process for refining cracked distillates containing olefins and sulphur which comprises treating the distillate in vapor phase simultaneously with ammonia gas and an alkaline earth metal at a temperature adequate to react the ammonia with the metal.

11. A process for refining cracked distillates containing olefins and sulphur which comprises treating the distillate in vapor phase simultaneously with ammonia gas and a mixture of an alkali metal and an alkaline earth metal at a temperature adequate to react the ammonia with at least one of said metals.

JACQUE C. MORRELL.